United States Patent
Yang et al.

(10) Patent No.: US 10,024,750 B2
(45) Date of Patent: Jul. 17, 2018

(54) CLEANING CYCLE FOR CAPLESS REFUELING NECK

(71) Applicant: Ford Global Technologies, LLC, Dearborn, MI (US)

(72) Inventors: Dennis Seung-Man Yang, Canton, MI (US); Aed M. Dudar, Canton, MI (US); Rob Ognjanovski, Jr., Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 890 days.

(21) Appl. No.: 14/168,865

(22) Filed: Jan. 30, 2014

(65) Prior Publication Data

US 2015/0211952 A1    Jul. 30, 2015

(51) Int. Cl.
  G01M 3/02   (2006.01)
  G01M 3/32   (2006.01)
  F02M 25/08  (2006.01)

(52) U.S. Cl.
  CPC ........ G01M 3/025 (2013.01); F02M 25/0809 (2013.01); G01M 3/32 (2013.01)

(58) Field of Classification Search
  CPC ..... G01M 3/025; G01M 3/32; F02M 25/0809
  USPC ...................................... 73/40.5 R
  See application file for complete search history.

(56) References Cited

U.S. PATENT DOCUMENTS

| | | | |
|---|---|---|---|
| 6,189,581 B1 | 2/2001 | Harris et al. | |
| 6,923,224 B1 | 8/2005 | McClung et al. | |
| 6,994,130 B1 | 2/2006 | Gabbey et al. | |
| 7,163,037 B2 | 1/2007 | Walkowski | |
| 2009/0314072 A1* | 12/2009 | Slusser | B60K 15/0406 73/114.43 |
| 2012/0215399 A1* | 8/2012 | Jentz | G01M 3/025 701/32.8 |
| 2015/0020779 A1* | 1/2015 | Peters | F02M 25/08 123/518 |
| 2015/0142293 A1* | 5/2015 | Dudar | G01M 15/05 701/101 |

OTHER PUBLICATIONS

Kobayashi, M. et al., "Evaporative Leak Check System by Depressurization Method," SAE Technical Paper Series No. 2004-01-0143, 2004 SAE World Congress, Detroit, MI, Mar. 8-11, 2004, 9 pages.
Sgatti, S. et al., "Development of Model-Based OBDII-Compliant Evaporative Emissions Leak Detection Systems," SAE Technical Paper Series No. 2008-01-1012, 2008 SAE World Congress, Detroit, MI, Apr. 14-17, 2008, 11 pages.

* cited by examiner

*Primary Examiner* — John Fitzgerald
*Assistant Examiner* — Rodney T Frank
(74) *Attorney, Agent, or Firm* — Julia Voutyras; McCoy Russell LLP

(57) ABSTRACT

A method for a vehicle, comprising: following a refueling event, venting a capless refueling assembly to a fuel tank; and then executing an evaporative emissions leak test. In this way, residual fuel trapped in the capless refueling assembly may be removed. This, in turn will prevent a pressure build-up in the capless refueling assembly which could lead to the downstream door opening during a leak test, thereby confounding results.

7 Claims, 7 Drawing Sheets

CLEANING CYCLE FOR CAPLESS REFUELING NECK

BACKGROUND AND SUMMARY

A capless refueling system provides numerous benefits to both the vehicle and vehicle operator. There is no risk of losing a refueling cap, of improperly replacing the refueling cap following a refueling event, or of stripping the threads of the refueling cap so it cannot form a complete seal. Any of these conditions may lead to an increase in evaporative emissions from the fuel tank, and may further prevent the vehicle from properly performing evaporative emissions leak tests.

One configuration for a capless refueling assembly includes an upstream door and downstream door that are biased closed by preloaded springs, sealing the fuel tank from atmosphere. The doors are forced opened sequentially when a refueling nozzle is inserted into the refueling assembly, and close upon withdrawal of the refueling nozzle.

However, residual fuel may be released from the refueling nozzle during withdrawal, and may become trapped between the upstream door and the downstream door of the refueling assembly following a refueling event. An increase in ambient temperature may cause the trapped fuel to vaporize, creating a positive pressure between the upstream and downstream doors. During an evaporative leak check module (ELCM)-based leak detection test, the vacuum drawn on the fuel system may, in conjunction with the positive pressure in the refueling assembly, be strong enough to force the downstream door open, which may in turn lead to a false-fail diagnosis.

The inventors herein have recognized the above problems and have developed systems and methods to at least partially address them. In one example, a method for a vehicle, comprising: following a refueling event, venting a capless refueling assembly to a fuel tank; and then executing an evaporative emissions leak test. In this way, residual fuel trapped in the capless refueling assembly may be removed. This, in turn will prevent a pressure build-up in the capless refueling assembly which could lead to the downstream door opening during a leak test, thereby confounding results.

In another example, a system for a vehicle fuel system, comprising: a fuel tank comprising a capless refueling assembly; a fuel vapor canister coupled to the fuel tank via a fuel tank isolation valve; a vacuum pump coupled to the fuel vapor canister via a canister vent valve; a controller configured with instructions stored in non-transitory memory, that when executed cause the controller to: following a refueling event, open the fuel tank isolation valve; open the canister vent valve; activate the vacuum pump to draw a vacuum on the fuel tank without checking for a leak; and then draw a vacuum on the fuel tank to check for a leak. In this way, the venting mechanism of the capless refueling assembly may be used to clear residual fuel from the assembly following a refueling event and/or prior to a leak test. Thus, no additional hardware or expense is necessary to realize this system.

In yet another example, a method for a vehicle, comprising: following a refueling event, opening a fuel tank isolation valve; activating an evaporative leak check module pump; drawing a vacuum greater than a threshold without checking for a leak; and then drawing a vacuum to check for a leak. In this way, an evaporative leak check module based test may be made to be more robust and more accurate, with fewer false-fail results. This, in turn, may lead to a reduction in in-field warranty service, and accordant savings to the vehicle manufacturer.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

The following detailed description relates to systems and methods for a cleaning cycle to be performed on a capless refueling assembly. Specifically, the description entails means for removing residual fuel from a capless refueling assembly between a refueling event and an evaporative emissions leak test. The systems and methods may be implemented in a hybrid vehicle including a fuel system, such as the hybrid vehicle and fuel system depicted in FIG. 1. The fuel system may include a capless refueling assembly, such as the capless refueling assembly depicted in FIG. 2. Residual fuel trapped in the capless refueling assembly may be removed by applying a vacuum to the assembly using an ELCM vacuum pump. FIGS. 3A-3C show schematic drawings of such an ELCM in various configurations. The capless cleaning cycle may be performed following a refueling event, using the method shown in FIG. 4, for example. The capless cleaning cycle may prevent false-failures in a subsequent ELCM-based leak test, such as the leak test shown in FIG. 5. Example timelines for refueling events followed by ELCM based leak tests are shown in FIGS. 6A and 6B.

Figure 6A:
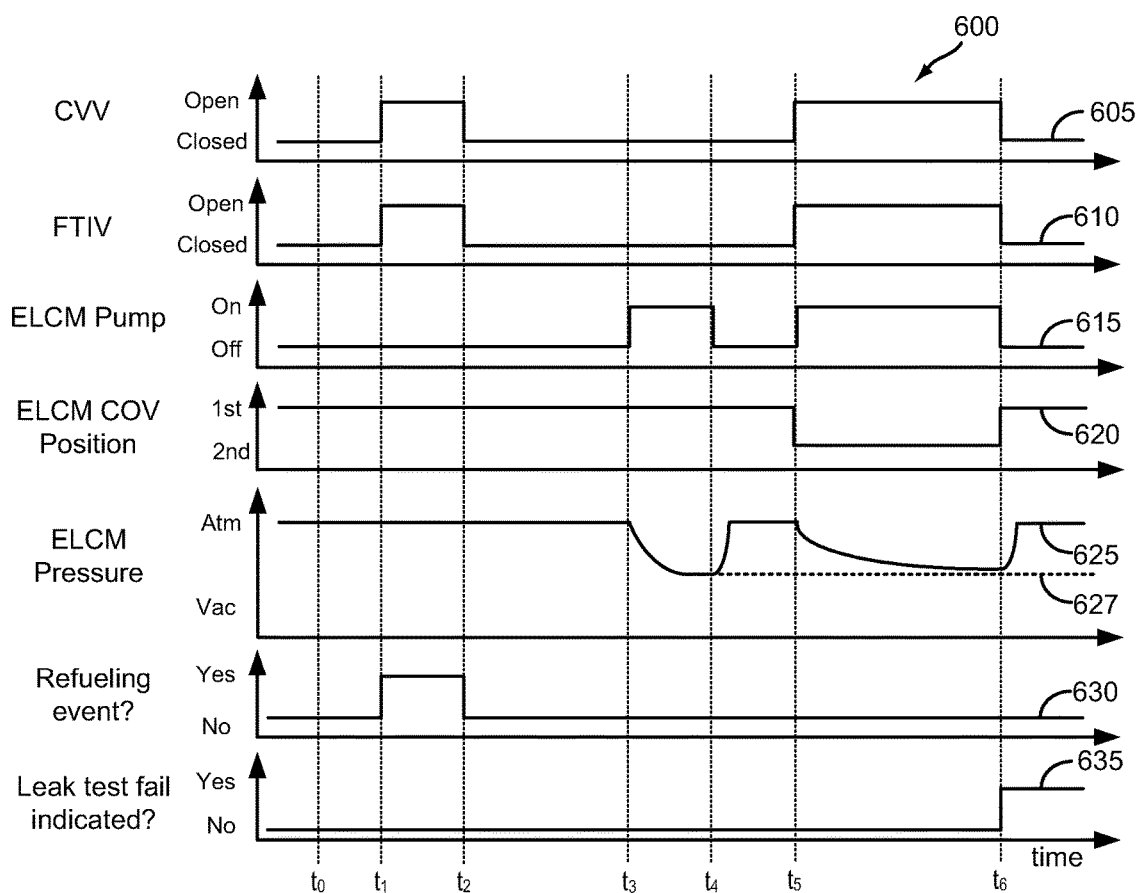
FIG. 6A shows an example timeline for a refueling event followed by a fuel system leak test in accordance with the present disclosure.
Figure 6B:
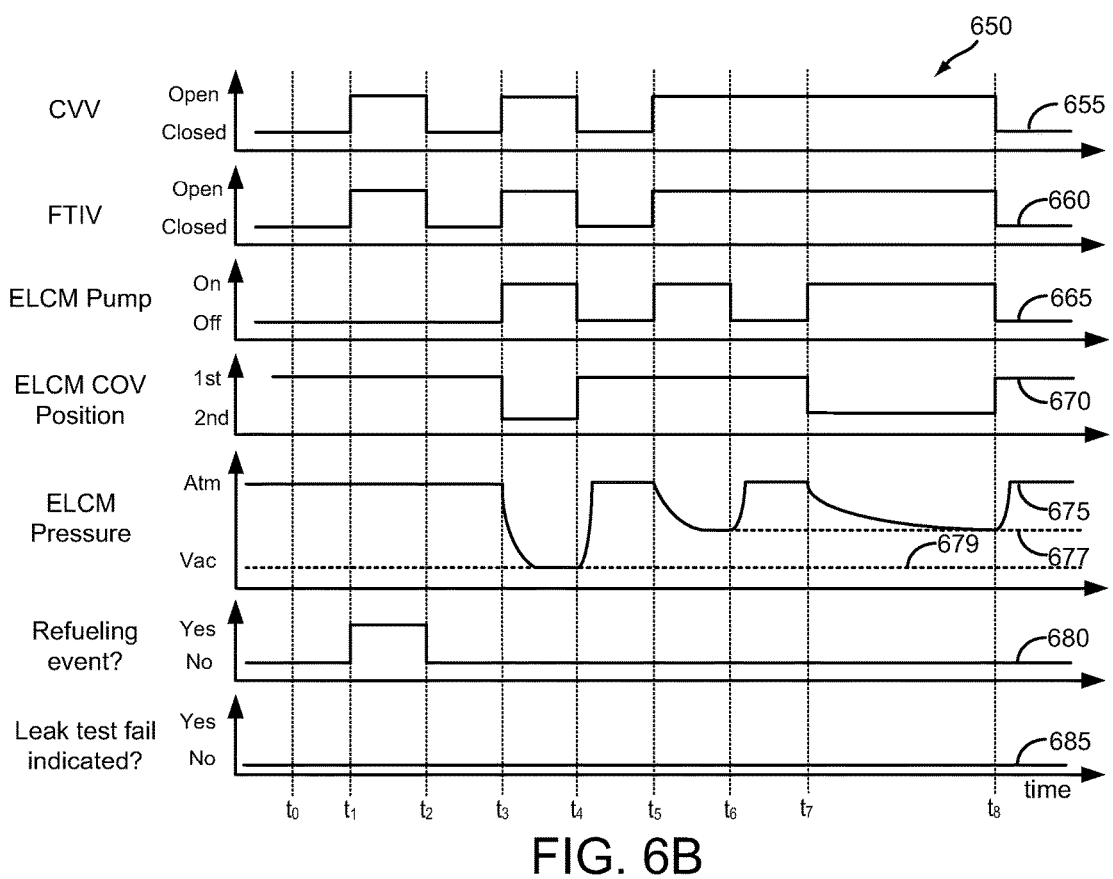
FIG. 6B shows an example timeline for a refueling event, followed by a capless cleaning cycle, followed by a fuel system leak test in accordance with the present disclosure. Note that FIG. 2 is drawn to scale, but other dimensions and configurations may be utilized without departing from the scope of this disclosure.

FIG. 6A shows a result of not performing a capless cleaning cycle between the refueling event and the leak test, while FIG. 6B shows a result of performing a capless cleaning cycle between the refueling event and the leak test.

Figure 1:
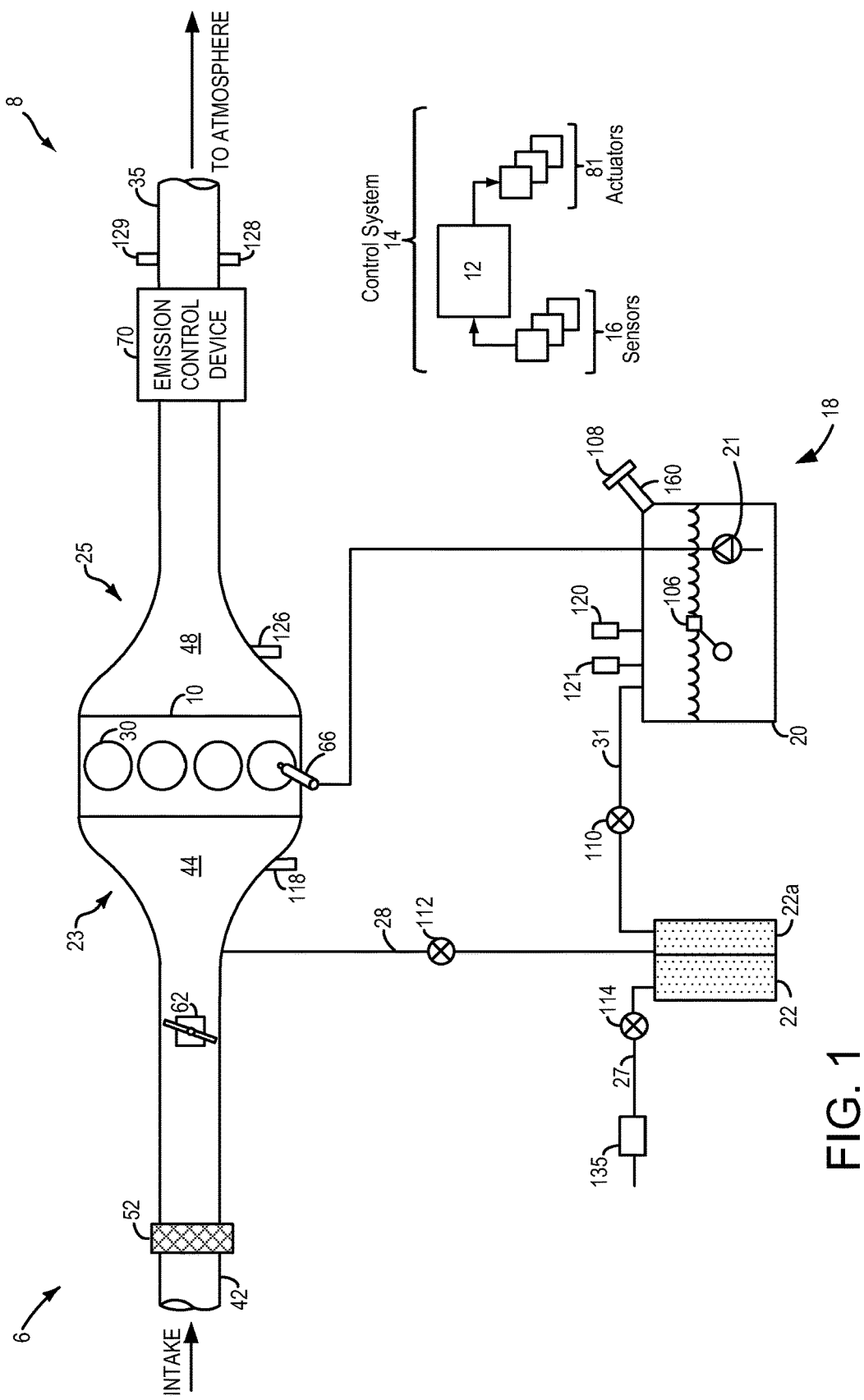
FIG. 1 shows a schematic depiction of a fuel system coupled to an engine system.

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling assembly 108. Refueling assembly 108 and the fuel tank 20 may be in fluidic communication via fuel passage 160. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used. Refueling assembly 108 may include a number of components configured to enable capless refueling, decrease air entrapment in the assembly, decrease the likelihood of premature nozzle shut-off during refueling, as well as increase the pressure differential in the fuel tank over an entire refueling operation, thereby decreasing the duration of refueling. A detailed schematic of one example configuration for refueling assembly 108, comprising a capless refueling assembly is described herein and with regards to FIG. 2.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid. In some examples, an air filter may be coupled in vent 27 between canister vent valve 114 and atmosphere.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc.

Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIG. 4.

Leak detection routines may be intermittently performed by controller 12 on fuel system 18 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 135 communicatively coupled to controller 12. ELCM 135 may be coupled in vent 27, between canister 22 and the atmosphere. ELCM 135 may include a vacuum pump for applying negative pressure to the fuel system when administering a leak test. ELCM 135 may further include a reference orifice and a pressure sensor. One embodiment of ELCM 135 is discussed in detail further herein and with regards to FIGS. 3A-2C. Following the applying of vacuum to the fuel system, a change in pressure at the reference orifice (e.g., an absolute change or a rate of change) may be monitored and compared to a threshold. Based on the comparison, a fuel system leak may be diagnosed.

Figure 2:
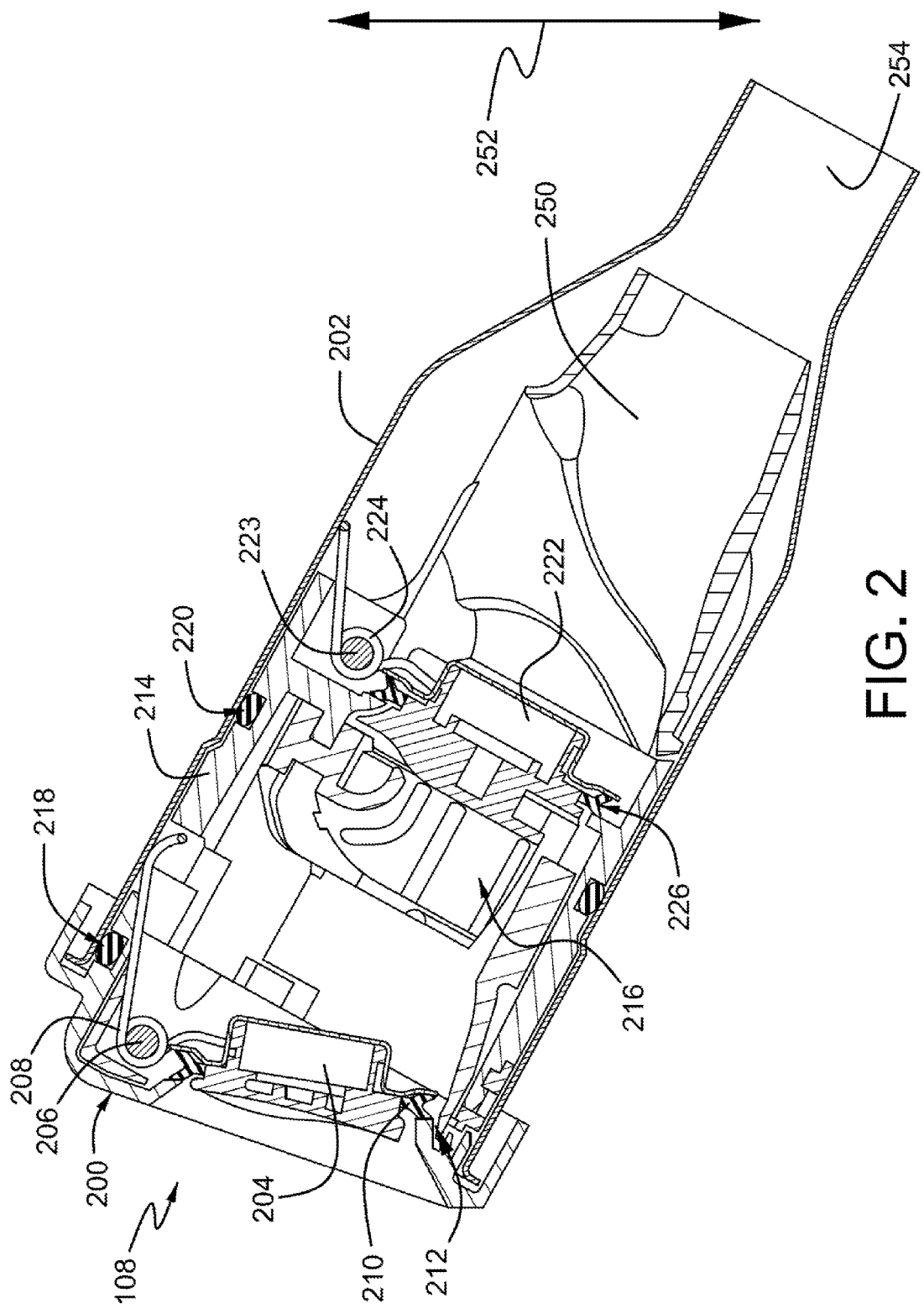
FIG. 2 shows an illustration of a capless refueling assembly for the fuel system of FIG. 1.
Figure 3A:
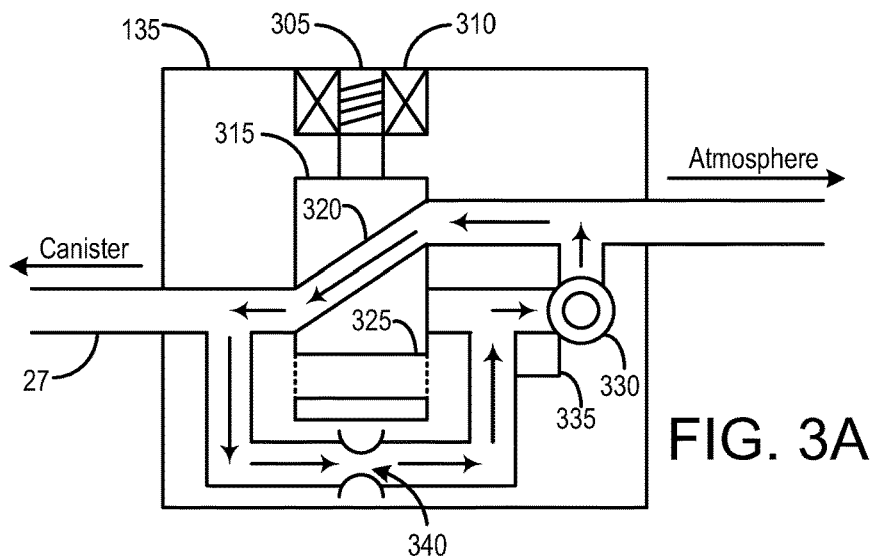
FIG. 3A shows a schematic depiction of an evaporative leak check module in a configuration to perform a reference check.
Figure 3B:
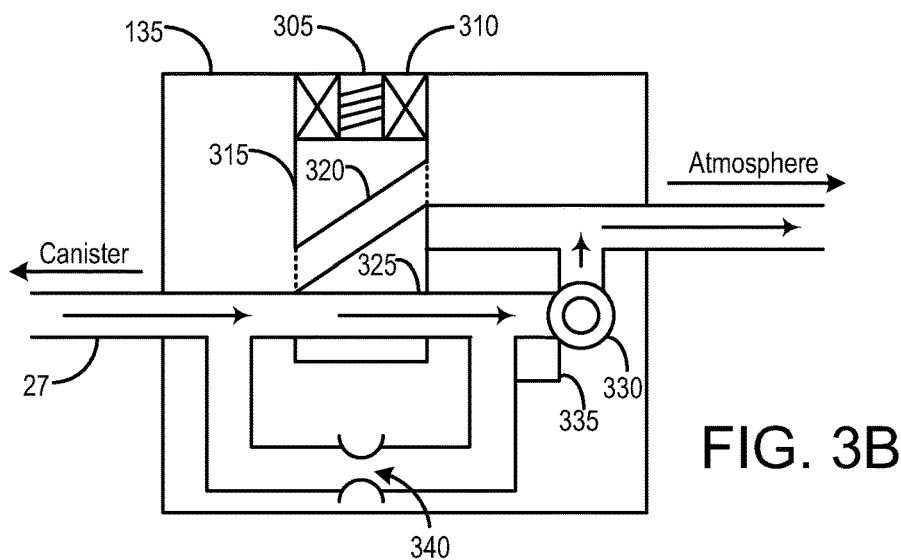
FIG. 3B shows a schematic depiction of an evaporative leak check module in a configuration to perform a tank evacuation leak check.
Figure 3C:
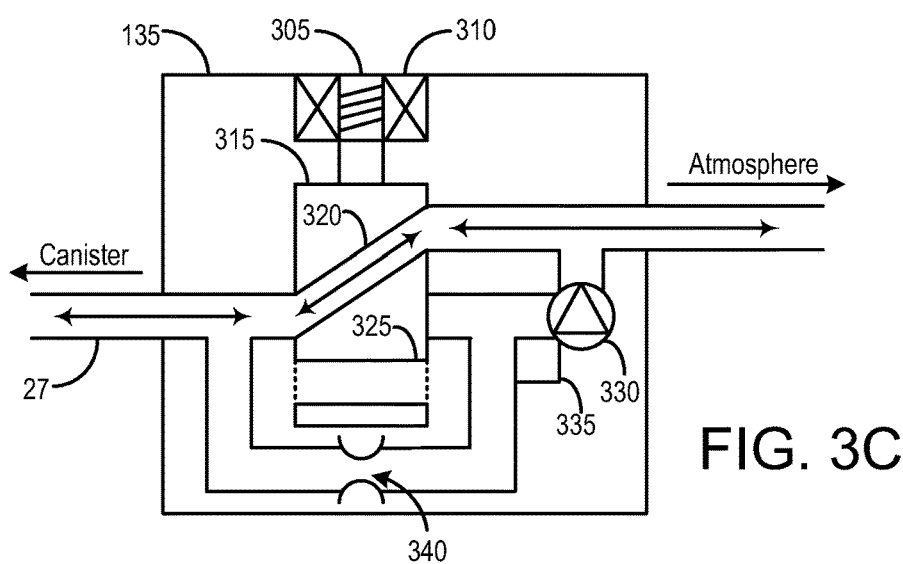
FIG. 3C shows a schematic depiction of an evaporative leak check module in a configuration to perform a purge operation.

FIG. 2 shows a refueling assembly 108. The refueling assembly 108 includes a cover 200. The cover 200 is configured to enclose components in the assembly. The refueling assembly further includes an external housing 202 configured to at least partially enclose various internal components of the refueling assembly 108. The refueling assembly 108 further includes an upstream door 204 having a hinge 206. The upstream door 204 is inset from the cover 200. A preloaded upstream spring 208 may be coupled to the upstream door 204 and the external housing 202. The preloaded upstream spring 208 coupled to the upstream door 204 providing a return force to the door when opened. The upstream spring 208 is configured to provide a return force when the upstream door 204 is depressed via a fuel nozzle. In this way, the upstream door 204 may close after a fuel nozzle is removed during a refueling event. Thus, the upstream door 204 automatically closes without assistance from a refueling operator. As a result, the refueling process is simplified.

A seal 210 may be attached to the upstream door 204. Specifically, the seal 210 may extend around the periphery of the upstream door 204, in some examples. When the upstream door 204 is in a closed position the seal may be in face sharing contact with the cover 200. In this way, the evaporative emissions from the refueling assembly 108 are reduced.

The refueling assembly 108 further includes a locking lip 212. The locking lip 212 may be configured to receive a portion of a fuel nozzle. In some examples, the locking lip 212 may be provided around at least 100° of the inside circumference of the refueling assembly 108. The locking lip 212 may influence the positioning and angle of the fuel nozzle axis spout during refueling and therefore has an impact on filling performance.

The refueling assembly 108 further includes an internal housing 214. The walls of the internal housing 214 may define a nozzle enclosure configured to receive a fuel nozzle. The internal housing 214 may also include a nozzle stop actuator 216 configured to actuate a portion of the fuel nozzle that initiate fuel flow from the fuel nozzle.

An upstream body seal 218 and a downstream body seal 220 may be provided in the refueling assembly 108 to seal the external housing 202 and various internal components in the refueling assembly 108. Specifically, the upstream and downstream body seals (218 and 220) are configured to extend between the external housing 202 and the internal housing 214. The upstream body seal 218 and/or downstream body seal 220 may be an O-ring in some examples.

The refueling assembly 108 further includes a downstream door 222 positioned downstream of the upstream door 204 and the nozzle stop actuator 216. The downstream door 222 includes a hinge 223 and has a preloaded downstream spring 224 coupled thereto. The preloaded downstream spring 224 is coupled to the downstream door 222 providing a return force to the downstream door 222 when opened The downstream spring 224 is also coupled to the external housing 202. The spring 224 is configured to provide a return force to the downstream door 222 when the downstream door 222 is in an open position. The downstream door 222 may also include a seal 226 (e.g., flap seal). The seal 226 may be positioned around the periphery of the downstream door 222, in some examples. The downstream door 222 enables the evaporative emissions during the refueling process to be further reduced. The downstream door 222 is arranged perpendicular to the fuel flow when closed, in the depicted example. However, other orientations of the downstream door 222 are possible.

Refueling assembly 108 may be positioned in a number of configurations in the vehicle 100, shown in FIG. 1. In one example, refueling assembly 108 has a downward gradient. In other words, upstream door 204 is positioned vertically above flow guide 250 with regard to gravitational axis 252. In this way, fuel flow is assisted via gravity during refueling operation.

Refueling assembly 108 includes flow guide 250 which is arranged downstream of downstream door 222. Refueling assembly 108 further includes filler pipe 254. Flow guide 250 may be at least partially enclosed by filler pipe 254. Filler pipe 254 is in fluidic communication with fuel tank 104 via fuel passage 160, as shown in FIG. 1.

Refueling assembly 108 may further include a vacuum relief mechanism (not shown). The vacuum relief mechanism may allow a passage in refueling assembly 108 to open under a threshold vacuum, allowing for the venting of fuel tank 20 to atmosphere. In this way, an excess of fuel tank vacuum will cause the vacuum relief mechanism to vent to atmosphere, preventing the fuel tank from collapsing. The vacuum threshold for activating the vacuum relief mechanism may be set at −20 inH2O, for example, or at a suitable threshold depending on the fuel tank design and configuration. The vacuum threshold may also be set at a level greater than vacuum conditions typically used for fuel tank leak testing using ELCM 135. For example, the vacuum threshold may be set above −12 inH$_2$O, for example, or at a suitable level depending on the configuration of ELCM 135 as described further herein and with regards to FIGS. 3A-C. In this way, an ELCM testing cycle may not trigger the vacuum relief mechanism (which may cause a false fail result), but such that naturally occurring tank vacuum above a threshold may be relieved. In some embodiments, the vacuum relief mechanism may not be an additional hardware component within refueling assembly 108. Rather, preloaded upstream spring 208 and preloaded downstream spring 224 may be set with a tension such that fuel tank vacuum above a threshold (e.g. −20 inH$_2$O) will cause upstream door 204 and downstream door 222 to open, venting fuel tank 20 to atmosphere. In some embodiments, preloaded upstream spring 208 and preloaded downstream spring 224 may be solenoid activated springs under control of controller 12. When fuel tank vacuum increases above the threshold vacuum (as determined by fuel tank pressure sensor 121, for example) controller 12 may deactivate the solenoids, allowing for upstream door 204 and downstream door 222 to open, venting fuel tank 20 to atmosphere. Upon fuel tank vacuum reaching a threshold level, the solenoids may be re-activated.

FIGS. 3A-3C show a schematic depiction of an example ELCM 135 in various conditions in accordance with the present disclosure. As shown in FIG. 1, ELCM 135 may be located along vent 27 between canister vent valve 114 and atmosphere. ELCM 135 includes a changeover valve (COV) 315, a pump 330, and a pressure sensor 335. Pump 330 may be a vane pump. COV 315 may be moveable between a first a second position. In the first position, as shown in FIGS. 2A and 2C, air may flow through ELCM 135 via first flow path 320. In the second position, as shown in FIG. 2B, air may flow through ELCM 135 via second flow path 325. The position of COV 315 may be controlled by solenoid 310 via compression spring 305. ELCM may also comprise reference orifice 340. Reference orifice 340 may have a diameter corresponding to the size of a threshold leak to be tested, for example, 0.02". In either the first or second position, pressure sensor 335 may generate a pressure signal reflecting the pressure within ELCM 135. Operation of valve 330 and solenoid 310 may be controlled via signals received from controller 12.

As shown in FIG. 3A, COV 315 is in the first position, and pump 330 is activated. Canister vent valve 114 (not shown) is closed, isolating ELCM 135 from the canister and fuel tank. Air flow through ELCM 135 in this configuration is represented by arrows. In this configuration, pump 330 may draw a vacuum on reference orifice 340, and pressure sensor 335 may record the vacuum level within ELCM 135. This reference check vacuum level reading may then become the threshold for passing/failing a subsequent leak test.

As shown in FIG. 3B, COV 315 is in the second position, and pump 330 is activated. Canister vent valve 114 (not shown) is open, allowing pump 330 to draw a vacuum on fuel system 18. In examples where fuel system 18 includes FTIV 110, FTIV 110 may be opened to allow pump 330 to draw a vacuum on fuel tank 20. Air flow through ELCM 135 in this configuration is represented by arrows. In this configuration, as pump 330 pulls a vacuum on fuel system 18, the absence of a leak in the system should allow for the vacuum level in ELCM 135 to reach or exceed the previously determined vacuum threshold. In the presence of a leak larger than the reference orifice, the pump will not pull down to the reference check vacuum level.

As shown in FIG. 3C, COV 315 is in the first position, and pump 330 is de-activated. Canister vent valve 114 is open, allowing for air to freely flow between atmosphere and the canister, such as during a canister purging operation.

Incorporating a capless refueling system provides numerous benefits to the vehicle and vehicle operator. There is no risk of losing a refueling cap, of improperly replacing the refueling cap following a refueling event, or of stripping the threads of the refueling cap so it cannot form a complete seal. Any of these conditions may lead to an increase in evaporative emissions from the fuel tank, and may further prevent the vehicle from properly performing evaporative emissions leak tests. The capless refueling system, such as the refueling assembly described herein and with regards to FIG. 2 presents one solution to these problems, but may cause additional problems in performing evaporative emissions tests. Residual fuel may be trapped between the upstream door and the downstream door of the refueling assembly following a refueling event. An increase in ambient temperature may cause the trapped fuel to vaporize, creating a positive pressure between the upstream and downstream doors. During an ELCM-based leak detection test, the vacuum drawn on the fuel system may, in conjunction with the positive pressure in the refueling assembly, be strong enough to force the downstream door open, which may in turn lead to a false-fail diagnosis.

Figure 4:
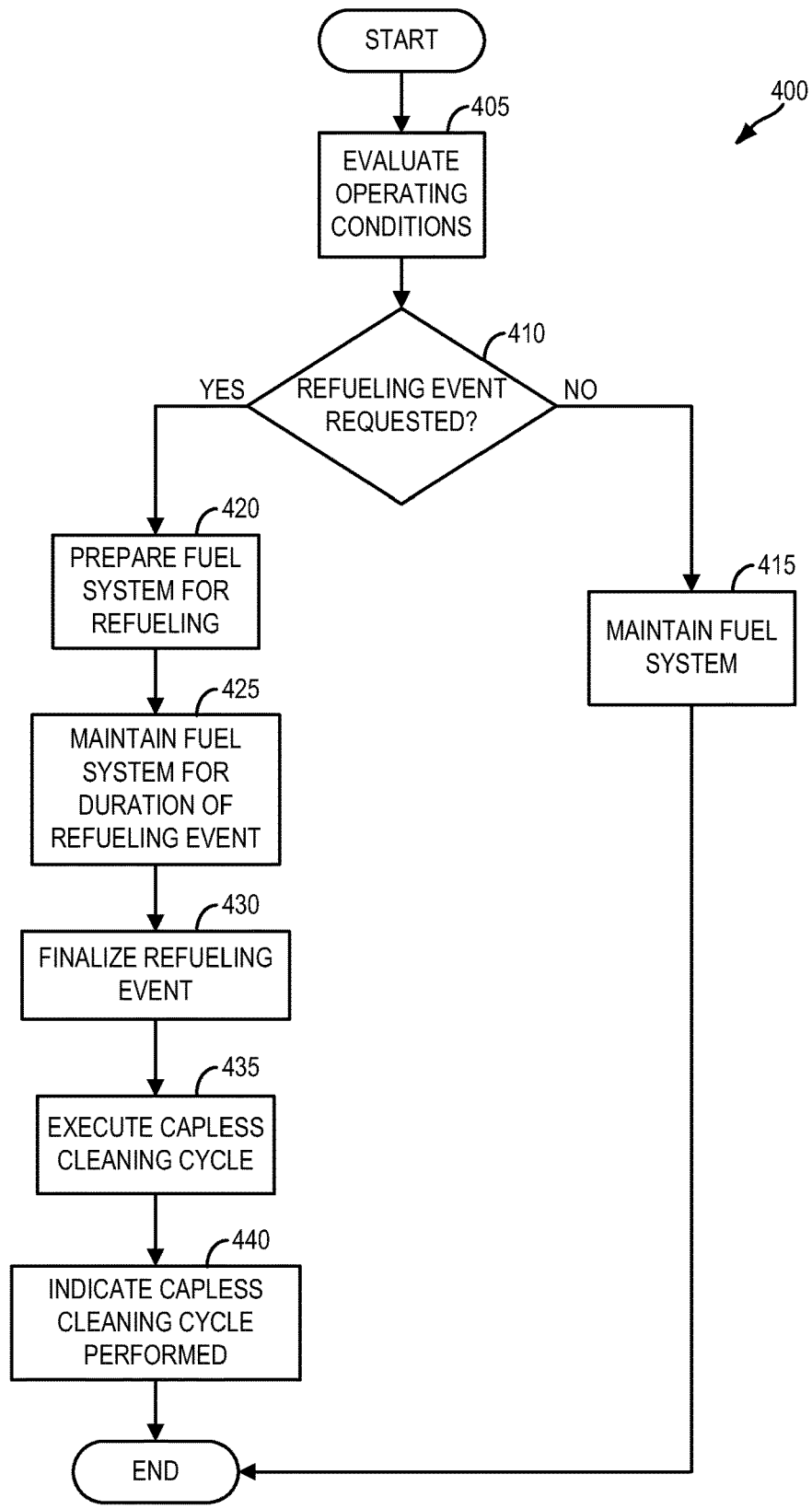
FIG. 4 shows an example method for a refueling event.

FIG. 4 shows a high-level flow chart for an example method 400 for a refueling event in accordance with the current disclosure. In particular, method 400 relates to a cleaning cycle for a capless refueling assembly that may be executed following a refueling event in order to mitigate false-failures during a subsequent ELCM-based leak test. Method 400 will be described herein with reference to the components and systems depicted in FIGS. 1, 2, and 3A-3C, though it should be understood that the method may be applied to other systems without departing from the scope of this disclosure. Method 400 may be carried out by controller 12, and may be stored as executable instructions in non-transitory memory.

Method 400 may begin at 405. At 405, method 400 may include evaluating operating conditions. Operating conditions may include, but are not limited to, fuel fill level, canister load level, engine operating status, fuel tank pressure, vehicle location (as determined through an on board GPS, for example), etc. Operating conditions may be measured by one or more sensors 16 coupled to controller 12, or may be estimated or inferred based on available data.

Continuing at 410, method 400 may include determining whether a refueling event is imminent. Determining whether a refueling event is imminent may include detecting a refueling request. For example, hybrid vehicle 6 may comprise a refueling request button located on the vehicle dashboard. Detecting depression of the refueling request button may indicate that a refueling event is imminent. In other examples, determining whether a refueling event is imminent may include detecting proximity to a refueling station. For example, the vehicle's proximity to a refueling station may be determined via an on-board GPS or through wireless communication between the vehicle and a refueling pump. In another example, the vehicle operator may request directions to a refueling station via the on-board GPS. In other examples, a refueling event may be inferred by the vehicle operator (or a refueling attendant) opening a refueling door or otherwise attempting to gain access to refueling assembly 108.

If it is determined that no refueling request is imminent, method 400 may proceed to 415. At 415, method 400 may include maintaining the status of fuel system 18. Method 400 may then end. If it is determined that a refueling request is imminent, method 400 may proceed to 420. At 420, method 400 may include preparing the fuel system for a refueling event. Preparing the fuel system for a refueling event may include placing fuel system 18 and engine system 8 in a refueling mode. As described herein and with regards to FIG. 1, a refueling mode may include closing CPV 112, opening CVV 114, and opening FTIV 110. In this way, fuel vapor currently stored in fuel tank 20 may be vented to canister 22, and subsequent fuel vapor generated during the refueling event may also be vented to canister 22. Air stripped of fuel vapor may exit canister 22 to atmosphere through vent 27. If access to refueling assembly 108 is protected by a refueling lock (such as a locking refueling door), method 400 may include unlocking the refueling lock following placing fuel system 18 into refueling mode. Preparing the fuel system for refueling may include aborting or suspending any evaporative emissions system leak test, and may further include recording the abortion or suspension of the leak test and setting a follow-up flag. No leak test or capless cleaning cycle may be performed immediately preceding the refueling event.

Continuing at 425, method 400 may include maintaining the fuel system in refueling mode for the duration of the refueling event. Maintaining the fuel system in refueling mode may include maintaining CPV 112 in a closed conformation, maintaining CVV 114 and FTIV 110 in an open conformation, and maintaining access to refueling assembly 108. Method 400 may then proceed to 430.

At 430, method 400 may include finalizing the refueling event when the refueling event has ended. The end of the refueling event may be signified by the withdrawal of a refueling nozzle from refueling assembly 108, which may correspond with the closing of downstream door 222 and upstream door 204. Finalizing the refueling event may include closing FITV 110, and may further include closing CVV 114. Finalizing the refueling event may further include restricting access to refueling assembly 108, by locking a refueling door, for example. Method 400 may then proceed to 435.

At 435, method 400 may include executing a capless cleaning cycle. The capless cleaning cycle may be performed immediately following the refueling event, for example prior to key-on, or following key-on but proceeding an engine-on event (such as in a hybrid vehicle). In some scenarios, if an engine-on event occurs within a threshold duration following the end of the refueling event, controller 12 may set a flag for follow up. In such scenarios, the capless cleaning cycle may be performed at the next available opportunity, such as a subsequent engine-off or key-off event. The capless cleaning cycle may be performed immediately prior to an ELCM based leak test without further refueling or breaching of upstream door 204. Such a method is described further herein and with regards to FIG. 5.

Executing a capless cleaning cycle may include opening (or maintaining open) FTIV 110, opening (or maintaining open) CVV 114, and closing (or maintaining closed) CPV 112. The capless cleaning cycle may then include placing ELCM changeover valve 315 in the second position, for example, by activating solenoid 310. ELCM pump 330 may then be activated. This ELCM configuration is shown in FIG. 3B. ELCM pump 330 may then draw a vacuum on fuel system 18. The vacuum drawn on fuel system 18 may exceed a vacuum threshold, for example −20 inH$_2$O, or another suitable vacuum threshold great enough to cause a vacuum relief mechanism within refueling assembly 108 to open and vent the fuel tank to atmosphere. As described herein and with regards to FIG. 2, the vacuum relied mechanism may comprise the opening of downstream door 222 and upstream door 204, or may comprise opening a separate relief mechanism to vent the tank to atmosphere. By triggering the vacuum relief mechanism, residual fuel trapped between downstream door 22 and upstream door 204 may be drawn through filler pipe 254 and fuel passage 160 into fuel tank 20. ELCM pump 330 may continue to draw a vacuum for a pre-determined duration, the duration long enough to remove residual fuel in refueling assembly 108. The capless cleaning cycle may then include de-activating ELCM pump 330 and placing ELCM changeover valve 315 in a first position, and may further include closing FTIV 110 and/or CVV 114. Method 400 may then proceed to 440.

At 440, method 400 may include indicating that a capless cleaning cycle has been performed. Indicating that a capless cleaning cycle has been performed may be accomplished by setting a parameter stored in memory at controller 12, by setting a parameter on a CAN bus that is communicated to one or more of the various processors on the network. Method 400 may then end.

Figure 5:
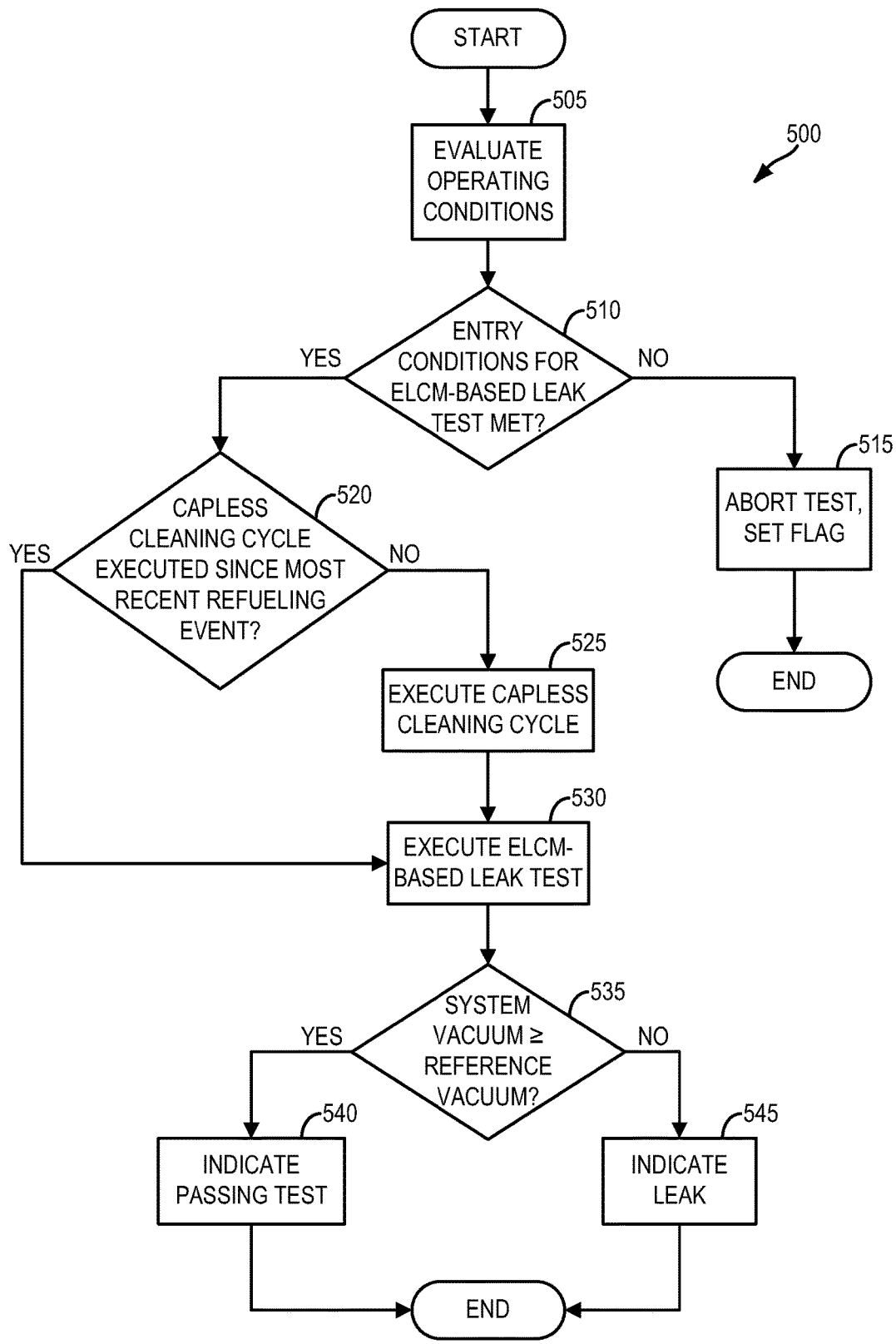
FIG. 5 shows an example method for a fuel system leak test.

FIG. 5 shows a high-level flow chart for an example method 500 for an ELCM based leak test in accordance with the current disclosure. In particular, method 500 relates to an ELCM-based leak test that incorporates a cleaning cycle for a capless refueling assembly in order to mitigate false-failures during the leak test. Method 500 will be described herein with reference to the components and systems depicted in FIGS. 1, 2, and 3A-3C, though it should be understood that the method may be applied to other systems without departing from the scope of this disclosure. Method 500 may be carried out by controller 12, and may be stored as executable instructions in non-transitory memory.

Method 500 may begin at 505 by estimating operating conditions. Operating conditions may include ambient conditions, such as temperature, humidity, and barometric pressure, as well as vehicle conditions, such as engine operating status, fuel level, etc. Continuing at 510, method 500 may include determining whether the entry conditions for an ELCM-based leak test are met. Entry conditions for an ELCM-based leak test may include an engine-off status, and/or determining that the fuel system is not undergoing a purge operation. If entry conditions are not met, method 500 may proceed to 515. At 515, method 500 may include recording that an ELCM-based leak test was aborted, and may further include setting a flag to retry the ELCM-based leak test at a later time point.

If entry conditions are met, method 500 may proceed to 520. At 520, method 500 may include determining whether a capless cleaning cycle has been executed since the most recent refueling event. Determining whether a capless cleaning cycle has been executed since the most recent refueling event may include accessing data stored on controller 12, such as checking to see if a flag has been set indicating a cleaning cycle has been performed. As described herein and with regards to FIG. 4, in some scenarios, a capless cleaning cycle may be performed in conjunction with and immediately following a refueling event. If a capless cleaning cycle has not been performed since the last refueling event, method 500 may proceed to 525. At 525, method 500 may include executing a capless cleaning cycle, such as the cleaning cycle described herein and with regards to FIG. 4. A capless cleaning cycle may be performed immediately preceding an ELCM-based leak test, without further refueling or breaching of upstream door 204 therein between.

Once a capless cleaning cycle has been performed, or it has been determined that a cleaning cycle has been performed since the last refueling event, method 500 may proceed to 530. At 530, method 500 may include executing an ELCM-based leak test. In some embodiments, the ELCM-based leak test may be performed when, and only when the capless refueling assembly has been vented to the fuel tank immediately prior. Briefly, executing an ELCM-based leak test may include performing an internal reference check followed by drawing a vacuum on the entire fuel system. Performing an internal reference check may include closing (or maintaining closed) CVV 114, placing changeover valve 315 in a first position, and activating ELCM pump 330. A pressure sensor, such as pressure sensor 335 may record the resulting vacuum level in the ELCM, after a certain amount of time, or when the vacuum level has reached a plateau. Then, drawing a vacuum on the entire fuel system may include opening (or maintaining open) CVV 114, opening (or maintaining open FTIV 110, closing (or maintaining closed) CPV 112, placing COV 315 in the second position (e.g. by activating solenoid 310), and activating pump 330. In this configuration, as pump 330 pulls a vacuum on fuel system 18, the absence of a leak in the system should allow for the vacuum level in ELCM 135 to reach or exceed the previously determined vacuum threshold. In the presence of a leak larger than the reference orifice, the pump will not pull down to the reference check vacuum level. Following the ELCM test, method 500 may include de-activating pump 330 and de-energizing solenoid 310, and may further include closing CVV 114 and/or FTIV 110.

Continuing at 535, method 500 may include determining whether the test vacuum acquired during the ELCM test is greater than or equal to the reference vacuum threshold. If the test vacuum acquired during the ELCM test is greater than or equal to the reference vacuum threshold, method 500 may proceed to 540. At 540, method 500 may include recording the occurrence of a passing ELCM test result. Method 500 may then end.

If test vacuum acquired during the ELCM test is not greater than or equal to the reference vacuum threshold, method 500 may proceed to 545. At 545, method 500 may include indicating the presence of a leak in fuel system 18. Indicating the presence of a leak may include recording the occurrence of a failing test result, and may further include illuminating an MIL. Method 500 may then end.

The systems described herein and with regards to FIGS. 1, 2, and 3A-3C, along with the methods described herein and with regards to FIGS. 4 and 5 may enable one or more systems and one or more methods. In one example, a method for a vehicle, comprising: following a refueling event, venting a capless refueling assembly to a fuel tank; and then executing an evaporative emissions leak test. Venting a capless refueling assembly to a fuel tank may further comprise: applying a vacuum greater than a threshold to the capless refueling assembly. Applying a vacuum greater than a threshold to the capless refueling assembly may further comprise: applying a vacuum to the capless refueling assembly such that a downstream door of the capless refueling assembly opens; and drawing fuel located upstream of the downstream door into the fuel tank. The vacuum threshold may be based on a tension of a spring coupled to the downstream door of the capless refueling assembly. For example, the threshold may be $-20$ inH$_2$O. In some embodiments, applying a vacuum greater than a threshold to the capless refueling assembly further comprises: opening a fuel tank isolation valve; opening a canister vent valve; and activating a vacuum pump within an evaporative leak check module coupled between a fuel vapor canister and atmosphere. In some embodiments, executing an evaporative emissions leak test further comprises: drawing a first vacuum on a reference orifice within the evaporative leak check module; drawing a second vacuum on a fuel system; and indicating a leak based on a comparison between the first vacuum and the second vacuum. Drawing a first vacuum on the reference orifice may further comprise: placing a changeover valve within the evaporative leak check module in a first position; closing the canister vent valve; and activating the vacuum pump. Drawing a second vacuum on the fuel system may further comprise: placing the changeover valve in a second position; opening the canister vent valve; opening the fuel tank isolation valve; and activating the vacuum pump. Indicating a leak based on the comparison between the first vacuum and the second vacuum may further comprise: indicating a leak if the first vacuum is greater than the second vacuum. The technical result of implementing this method is the removal of residual fuel from a capless refueling assembly following a refueling event and preceding an evaporative emissions leak check. Removing fuel from the capless refueling assembly will prevent an increase in pressure occurring within the assembly as the fuel volatizes with an increase in ambient temperature. This increased pressure could otherwise lead to the downstream door of the assembly opening during a leak test, thereby confounding any results.

In another example, a system for a vehicle fuel system, comprising: a fuel tank comprising a capless refueling assembly; a fuel vapor canister coupled to the fuel tank via a fuel tank isolation valve; a vacuum pump coupled to the fuel vapor canister via a canister vent valve; a controller configured with instructions stored in non-transitory memory, that when executed cause the controller to: following a refueling event, open the fuel tank isolation valve; open the canister vent valve; activate the vacuum pump to draw a vacuum on the fuel tank without checking for a leak; and then draw a vacuum on the fuel tank to check for a leak. Drawing a vacuum on the fuel tank without checking for a leak further comprises: drawing a vacuum greater than a threshold. The vacuum threshold may be based on a minimum vacuum necessary to vent the capless refueling assembly, such as $-20$ inH$_2$O. The controller may be further configured with instructions stored in non-transitory memory, that when executed cause the controller to: determine whether the capless refueling assembly has been vented since a most recent refueling event; and suspend a leak test if the capless refueling assembly has not been vented since the most recent refueling event. The vacuum pump may be included in an evaporative leak check module. The technical result of implementing this system is that the venting mechanism of the capless refueling assembly may be used to clear residual fuel from the assembly following a refueling event and/or prior to a leak test. In this way, no additional hardware or expense is necessary to realize this system, providing a benefit without additional cost.

In yet another example, a method for a vehicle, comprising: following a refueling event, opening a fuel tank isolation valve; activating an evaporative leak check module pump; drawing a vacuum greater than a threshold without checking for a leak; and then drawing a vacuum to check for a leak. The vacuum threshold may be based on a minimum vacuum necessary to vent a capless refueling assembly. The minimum vacuum necessary to vent the capless refueling assembly may be based on the tension of a spring coupled to a downstream door of the capless refueling assembly. Drawing a vacuum to check for a leak may further comprises: drawing a first vacuum on an reference orifice within an evaporative leak check module; drawing a second vacuum on a fuel system; and indicating a leak based on a comparison between the first vacuum and the second vacuum. The technical result of implementing this method is an evaporative leak check module based test that is more robust and more accurate, with fewer false-fail results. This, in turn, may lead to a reduction in in-field warranty service, and accordant savings to the vehicle manufacturer.

FIG. 6A shows an example timeline 600 for an evaporative leak check module based leak test using the method described herein and with regards to FIG. 4 applied to the system described herein and with regards to FIGS. 1, 2 and 3A-3C, but without performing a capless cleaning cycle between a refueling event and a leak test. Timeline 600 includes plot 605 indicating the status of a CVV over time. Timeline 600 also includes plot 610 indicating the status of an FTIV over time. Timeline 600 further includes plot 615 indicating the status of an ELCM pump over time, plot 620, indicating the status of an ELCM changeover valve over time, and plot 625, indicating the pressure at an ELCM pressure sensor over time. Still further, timeline 600 includes plot 630, indicating whether a refueling event is ongoing, and plot 635, indicating whether a leak test fail is indicated. Line 627 represents a pressure threshold for an ELCM pressure. A CPV (not shown) may be assumed to be closed throughout timeline 600.

At time $t_0$, the CVV and FTIV are closed, as shown by plots 605 and 610. The ELCM pump is off, and the ELCM COV is in the first position, as shown by plots 615 and 620. As such, the pressure seen at the ELCM is at atmosphere, as shown by plot 625. No refueling event is ongoing, as shown by plot 630, and no leak test fail is indicated, as shown by plot 635.

At time $t_1$, a refueling event commences, as shown by plot 630. Accordingly, the CVV and FTIV are opened, as shown by plots 605 and 610, in order to allow refueling vapors to be directed to the fuel vapor canister. The refueling event lasts from time $t_1$ to time $t_2$. At time $t_2$, the CVV and FTIV are closed. Residual liquid fuel may, at this point, be trapped within the capless refueling assembly.

At time $t_3$, entry conditions are met for an ELCM based leak test. The ELCM COV remains in the $1^{st}$ position, as shown by plot 620, while the CVV and FTIV remain closed, and the ELCM pump is turned on. In this configuration, a vacuum is drawn on the internal reference orifice of the ELCM, but not on the fuel system. The ELCM pressure thus drops, as shown by plot 625. At time $t_4$, the pressure in the ELCM reaches a plateau. This pressure is set as the reference vacuum, as designated by line 627. The ELCM pump is then shut off, as indicated by plot 615, and the pressure at the ELCM returns to atmosphere, as shown by plot 625.

At time $t_5$, the test portion of the ELCM based leak test begins. Accordingly the CVV and FTIV are opened, as shown by plots 605 and 610, the ELCM COV is placed in the second position, and the ELCM pump is turned on. In this configuration, the ELCM pump will draw a vacuum on the fuel tank and fuel system. The ELCM pump draws a vacuum on the fuel tank and fuel system from time $t_5$ to time $t_6$. However, the residual fuel in the capless fuel assembly may vaporize, causing a positive pressure within the refueling assembly. The vacuum within the fuel system may thus open the downstream door, increasing the volume of the fuel system, and preventing the vacuum in the system from reaching the threshold represented by line 627. As such, at time $t_6$, the test portion ends without the reference vacuum being reached. Accordingly, a leak test fail is indicated, as shown by plot 635. The ELCM pump is shut off, and the ELCM pressure returns to atmosphere. The CVV and FTIV are then closed, and the ELCM COV is returned to the first position.

FIG. 6B shows an example timeline 650 for an evaporative leak check module based leak test using the method described herein and with regards to FIGS. 3 and 4 applied to the system described herein and with regards to FIGS. 1, 2 and 3A-3C, including performing a capless cleaning cycle between a refueling event and a leak test. The conditions for timeline 650 are identical to the conditions for timeline 600. Timeline 650 includes plot 655 indicating the status of a CVV over time. Timeline 650 also includes plot 660 indicating the status of an FTIV over time. Timeline 650 further includes plot 665 indicating the status of an ELCM pump over time, plot 670, indicating the status of an ELCM changeover valve over time, and plot 675, indicating the pressure at an ELCM pressure sensor over time. Still further, timeline 650 includes plot 680, indicating whether a refueling event is ongoing, and plot 685, indicating whether a leak test fail is indicated. Line 687 represents a pressure threshold for an ELCM pressure. Line 689 represents a vacuum threshold for a capless cleaning cycle. A CPV (not shown) may be assumed to be closed throughout timeline 650.

At time $t_0$, the CVV and FTIV are closed, as shown by plots 655 and 660. The ELCM pump is off, and the ELCM COV is in the first position, as shown by plots 665 and 670. As such, the pressure seen at the ELCM is at atmosphere, as shown by plot 675. No refueling event is ongoing, as shown by plot 680, and no leak test fail is indicated, as shown by plot 685.

At time $t_1$, a refueling event commences, as shown by plot 680. Accordingly, the CVV and FTIV are opened, as shown by plots 655 and 660, in order to allow refueling vapors to be directed to the fuel vapor canister. The refueling event lasts from time $t_1$ to time $t_2$. At time $t_2$, the CVV and FTIV are closed. Residual liquid fuel may, at this point, be trapped within the capless refueling assembly.

At time $t_3$, a capless cleaning cycle commences. The CVV and FTIV are opened, the ELCM COV is placed in the second position, and the ELCM pump is turned on. In this configuration, a vacuum may be drawn on the fuel tank, fuel system, and capless refueling assembly. The ELCM pump draws a vacuum until the pressure seen at the ELCM reaches the capless cleaning cycle vacuum threshold, as represented by line 679. At this vacuum, the venting mechanism of the capless refueling assembly opens, allowing for residual fuel trapped within the refueling assembly to be drawn into the fuel tank. The ELCM pump holds this vacuum level for a duration, and is then turned off at time $t_4$. The ELCM pressure returns to atmosphere, as shown by plot 675. The ELCM COV is returned to the first position, and the CVV and FTIV are both closed.

At time $t_5$, entry conditions are met for an ELCM based leak test. The ELCM COV remains in the $1^{st}$ position, as shown by plot 670, while the CVV and FTIV remain closed, and the ELCM pump is turned on. In this configuration, a vacuum is drawn on the internal reference orifice of the ELCM, but not on the fuel system. The ELCM pressure thus drops, as shown by plot 675. At time $t_6$, the pressure in the ELCM reaches a plateau. This pressure is set as the reference vacuum, as designated by line 677. The ELCM pump is then shut off, as indicated by plot 665, and the pressure at the ELCM returns to atmosphere, as shown by plot 675.

At time $t_7$, the test portion of the ELCM based leak test begins. Accordingly the CVV and FTIV are opened, as shown by plots 655 and 660, the ELCM COV is placed in the second position, and the ELCM pump is turned on. In this configuration, the ELCM pump will draw a vacuum on the fuel tank and fuel system. The ELCM pump draws a vacuum on the fuel tank and fuel system from time $t_7$ to time $t_8$. At time $t_8$, the pressure at the ELCM reaches the reference threshold depicted by line 677. With test vacuum reaching the reference vacuum, a passing test is recorded, and no leak test fail is indicated, as shown by plot 685. The ELCM pump is shut off, and the ELCM pressure returns to atmosphere. The CVV and FTIV are then closed, and the ELCM COV is returned to the first position.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle fuel system, comprising: a fuel tank comprising a capless refueling assembly;
    a fuel vapor canister coupled to the fuel tank via a fuel tank isolation valve; a vacuum pump coupled to the fuel vapor canister via a canister vent valve; and a controller configured with instructions stored in non-transitory memory, that when executed cause the controller to:
    following a refueling event, open the fuel tank isolation valve; open the canister vent valve;
        activate the vacuum pump to draw a vacuum greater than a threshold on the fuel tank without checking for a leak; and then draw a vacuum on the fuel tank to check for a leak; where the threshold is based on a minimum vacuum necessary to vent the capless refueling assembly.

2. The system of claim 1, where the threshold is −20 in $H_2O$.

3. The system of claim 1, where the controller is further configured with instructions stored in non-transitory memory, that when executed cause the controller to:
    determine whether the capless refueling assembly has been vented since a most recent refueling event; and
    suspend a leak test if the capless refueling assembly has not been vented since the most recent refueling event.

4. The system of claim 1, where the vacuum pump is included in an evaporative leak check module.

5. A method for a vehicle, comprising:
    following a refueling event, opening a fuel tank isolation valve; activating an evaporative leak check module pump;
    drawing a vacuum greater than a threshold without checking for a leak; and then drawing a vacuum to check for a leak; where the threshold is based on a minimum vacuum necessary to vent a capless refueling assembly.

6. The method of claim 5, where the minimum vacuum necessary to vent the capless refueling assembly is based on a tension of a spring coupled to a downstream door of the capless refueling assembly.

7. The method of claim 5, where drawing a vacuum to check for a leak further comprises:
    drawing a first vacuum on a reference orifice within an evaporative leak check module;
    drawing a second vacuum on a fuel system; and
    indicating a leak based on a comparison between the first vacuum and the second vacuum.

* * * * *